US010063065B2

(12) United States Patent
Cho

(10) Patent No.: US 10,063,065 B2
(45) Date of Patent: Aug. 28, 2018

(54) WIRELESS POWER TRANSMITTER

(71) Applicant: Samsung Electro-Mechanics Co., Ltd., Suwon-si (KR)

(72) Inventor: Sang Ho Cho, Suwon-Si (KR)

(73) Assignee: Samsung Electro-Mechancies Co., Ltd., Suwon-si (KR)

(*) Notice: Subject to any disclaimer, the term of this patent is extended or adjusted under 35 U.S.C. 154(b) by 227 days.

(21) Appl. No.: 14/851,651

(22) Filed: Sep. 11, 2015

(65) Prior Publication Data
US 2016/0204620 A1 Jul. 14, 2016

(30) Foreign Application Priority Data

Jan. 13, 2015 (KR) .................. 10-2015-0005919
Apr. 21, 2015 (KR) .................. 10-2015-0056021

(51) Int. Cl.
H02J 5/00 (2016.01)
H02J 7/00 (2006.01)
H02J 7/02 (2016.01)
H02J 50/80 (2016.01)
H02J 50/10 (2016.01)
H02M 1/00 (2006.01)

(52) U.S. Cl.
CPC ............ *H02J 5/005* (2013.01); *H02J 7/0042* (2013.01); *H02J 7/025* (2013.01); *H02J 50/10* (2016.02); *H02J 50/80* (2016.02); *H02M 2001/0025* (2013.01)

(58) Field of Classification Search
CPC .. H02J 5/005; H02J 7/042; H02J 7/025; H02J 17/00; H02M 2001/0025; H04B 5/0025–5/0093; B60L 11/1829–11/1831; Y02T 90/122; H01F 38/14; H01F 2038/143–2038/146; A61N 1/3787; A61B 1/00029
USPC .......................................... 307/104; 320/108
See application file for complete search history.

(56) References Cited

U.S. PATENT DOCUMENTS 9,379,555 B2 * 6/2016 Huynh ................ H02J 50/12
2012/0242276 A1 9/2012 Jung et al.
(Continued)

FOREIGN PATENT DOCUMENTS

CN 101147308 A 3/2008
CN 101233666 A 7/2008
(Continued)

OTHER PUBLICATIONS

Extended European Search Report dated May 25, 2016 in counterpart European Application No. 15185420.5 (8 pages in English).
(Continued)

*Primary Examiner* — Hal Kaplan
(74) *Attorney, Agent, or Firm* — NSIP Law

(57) ABSTRACT

A wireless power transmitter for receiving external power from a power adaptor includes an output control signal generator configured to generate an output control signal from the external power, and supply the output control signal to the power adaptor; and a wireless power generator configured to generate power to be wirelessly transmitted to a wireless power receiver using the external power supplied by the power adaptor in response to the output control signal, and wirelessly transmit the generated power to the wireless power receiver.

23 Claims, 13 Drawing Sheets

(56) References Cited

U.S. PATENT DOCUMENTS

2013/0106364 A1    5/2013  Baarman et al.
2013/0314069 A1   11/2013  Suzuki
2015/0318707 A1   11/2015  Huynh

FOREIGN PATENT DOCUMENTS

| CN | 102299570 A | 12/2011 |
| EP | 0 533 247 A1 | 3/1993 |
| JP | 2014-3877 A | 1/2014 |
| KR | 10-1181818 B1 | 9/2012 |
| KR | 10-2012-0109067 A | 10/2012 |
| KR | 10-2012-0135086 A | 12/2012 |
| WO | WO 2007/015599 A1 | 2/2007 |
| WO | WO 2008/050917 A1 | 5/2008 |

OTHER PUBLICATIONS

Korean Office Action dated Dec. 1, 2016 in counterpart Korean Application No. 10-2015-0056021. (16 pages in Korea with English translation).

Chinese Office Action dated Nov. 3, 2017 in corresponding Chinese Patent Application No. 201510647097.X. (12 pages in English 9 pages in Chinese).

\* cited by examiner

WIRELESS POWER TRANSMITTER

CROSS-REFERENCE TO RELATED APPLICATION(S)

This application claims the benefit under 35 USC 119(a) of Korean Patent Application Nos. 10-2015-0005919 filed on Jan. 13, 2015, and 10-2015-0056021 filed on Apr. 21, 2015, in the Korean Intellectual Property Office, the entire disclosures of which are incorporated herein by reference for all purposes.

BACKGROUND

1. Field

This application relates to a wireless power transmitter.

2. Description of Related Art

Wireless power transfer technology is being applied to chargers used for various devices, such as communications devices including smartphones and home appliances, and is a technology that in the future may be applied to a wide range of fields, including, for example, electric vehicles.

A transmitter wirelessly transmitting power generates power to be transmitted wirelessly after having received power from an external power source. In certain cases, such as in a case in which a quick charge is required to be performed, the magnitude of the external power needs to be changed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter for receiving external power from a power adaptor includes an output control signal generator configured to generate an output control signal from the external power, and supply the output control signal to the power adaptor; and a wireless power generator configured to generate power to be wirelessly transmitted to a wireless power receiver from the external power received from the power adaptor controlled by the output control signal, and wirelessly transmit the generated power to the wireless power receiver.

The external power may include first direct current (DC) power; and second DC power having a voltage higher than a voltage of the first DC power; and the output control signal generator may be further configured to generate the output control signal by performing a step-down operation on the first DC power.

The output control signal may include a first output control signal; and a second output control signal having a voltage lower than a voltage of the first output control signal.

The output control signal generator may include a first low-dropout (LDO) regulator configured to convert the external power into the first output control signal; and a second LDO regulator configured to convert the external power into the second output control signal.

The output control signal generator may include an LDO regulator configured to convert the external power into the first output control signal; and two or more resistor elements configured to divide the first output control signal and output the divided first output control signal as the second output control signal.

The output control signal generator may include a first LDO regulator configured to convert the external power into the first output control signal; and a second LDO regulator configured to convert the first output control signal into the second output control signal.

The output control signal generator may include a first DC/DC converter configured to convert the external power into the first output control signal; and a second DC/DC converter configured to convert the external power into the second output control signal.

The output control signal generator may include a DC/DC converter configured to convert the external power into the first output control signal; and two or more resistor elements configured to divide the first output control signal and output the divided first output control signal as the second output control signal.

The output control signal generator may include a first linear regulator configured to convert the external power into the first output control signal; and a second linear regulator configured to convert the external power into the second output control signal.

The output control signal generator may include a first linear regulator configured to convert the external power into the first output control signal; and a second linear regulator configured to convert the first output control signal into the second output control signal.

The output control signal generator may include a first linear regulator configured to convert the external power into the first output control signal; and two or more resistor elements configured to divide the first output control signal and output the divided first output control signal as the second output control signal.

The output control signal generator may include a first Zener regulator connected in series between a terminal to which the external power is input and a ground terminal, and configured to output the first output control signal from the external power; and a second Zener regulator connected in series between the terminal to which the external power is input and the ground terminal, and configured to output the second output control signal from the external power; and each of the first and second Zener regulators may include a resistor element and a Zener diode connected to each other in series.

In another general aspect a wireless power transmitter for receiving, from a power adaptor, first direct current (DC) power or second DC power having a voltage higher than a voltage of the first DC power includes an output control signal generator configured to generate an output control signal by performing a step-down operation on the first DC power, and supply the output control signal to the power adaptor; and a wireless power generator configured to generate power to be wirelessly transmitted to a wireless power receiver from the first DC power or the second DC power received from the power adaptor controlled by the output control signal, and wirelessly transmit the generated power to the wireless power receiver.

The wireless power generator may include a converter configured to convert the first DC power or the second DC power into driving power; an inverter configured to convert the driving power into alternating current (AC) power to be wirelessly transmitted to the wireless power receiver; and a controller configured to control the converter and the inverter.

The controller may be further configured to variably control an output of the inverter depending on a magnitude of the DC power received from the power adaptor.

The converter may include a switching element; and the controller may be further configured to increase a duty ratio of the switching element of the converter in response to the first DC power being received from the power adaptor, and decrease a duty ratio of the switching element of the converter in response to the second DC power being received from the power adaptor.

In another general aspect, a wireless power transmitter includes an output control signal generator configured to receive external power from a power adaptor, generate an output control signal, and supply the output control signal to the power adapter, the power adaptor being configured to change the external power in response to the output control signal; and a wireless power generator configured to generate power to be wirelessly transmitted to a wireless power receiver from the external power received from the power adaptor controlled by the output control signal, and wirelessly transmit the generated power to the wireless power receiver.

The power adaptor may be further configured to output first external power in the absence of the output control signal, and output second external power having a different magnitude than the first external power in response to the presence of the output control signal.

The external power may be direct current (DC) power; the wireless power generator may be further configured to convert the DC power into alternating current (AC) power to be wirelessly transmitted to the wireless power receiver; and the wireless power generator may include a controller configured to control a magnitude of the AC power.

The wireless power transmitter may further include a voltage input determiner configured to receive the external power, generate a constant DC voltage from the external power, and supply the constant DC voltage to the controller to provide the controller with operating power.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
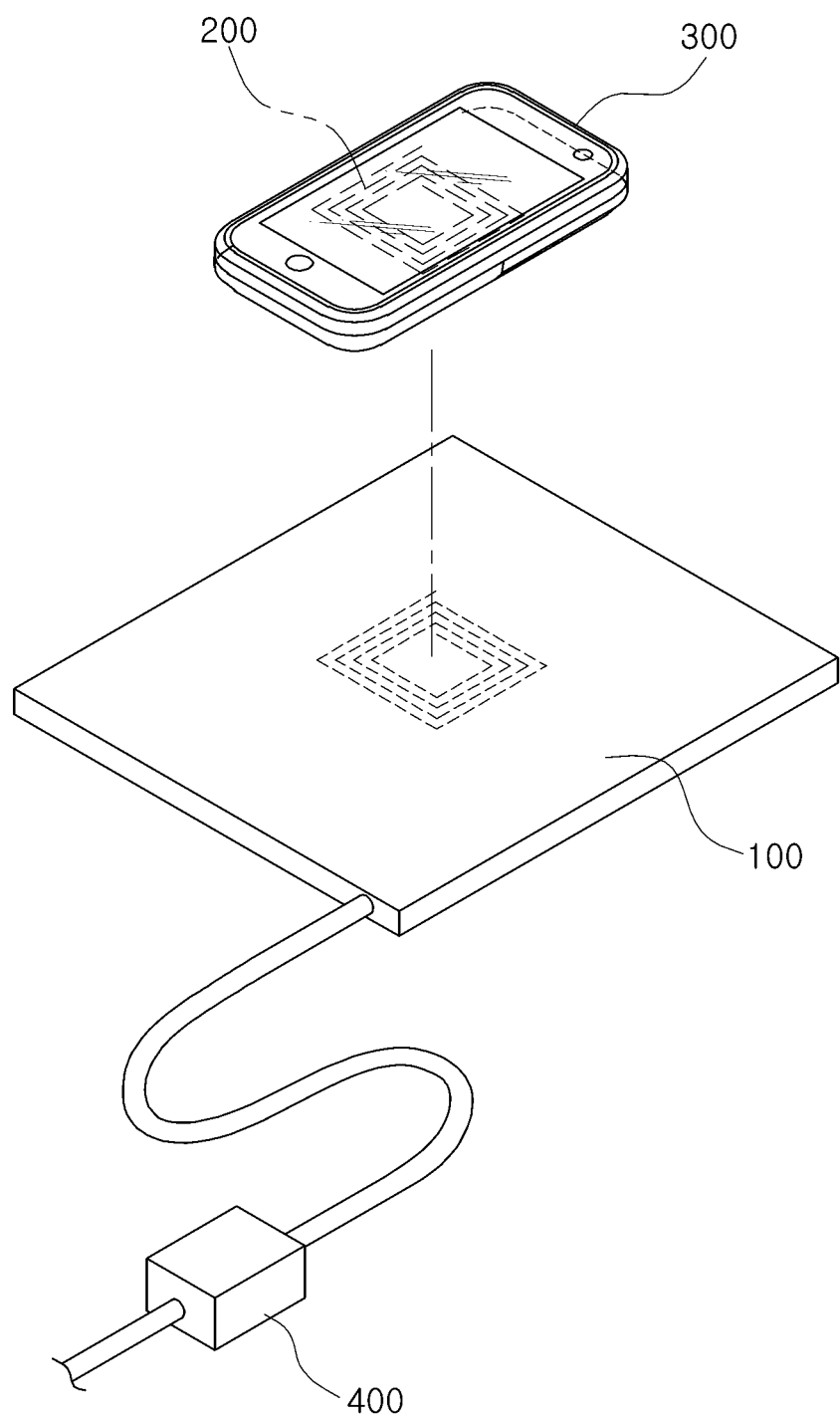
FIG. 1 is a diagram illustrating an example of a wireless power transmitter.

FIG. 1 is a diagram illustrating an example of a wireless power transmitter.

Referring to FIG. 1, a wireless power receiver 200 wirelessly receives power from a wireless power transmitter 100. The wireless power receiver 200 may be connected to an electronic device 300 to supply the received power to the electronic device 300.

The wireless power transmitter 100 wirelessly transmits power externally using power supplied from an external power source. That is, the wireless power transmitter 100 receives power from a power adaptor 400, and wirelessly supplies the power to the wireless power receiver 200. In this application, the power supplied to the wireless power transmitter 100 from the power adaptor 400 is referred to as "external power."

The power adaptor 400 supplies the external power to the wireless power transmitter 100. For example, the power adaptor 400 receives commercially available alternating current (AC) power, converts the received AC power into direct current (DC) power, and supplies the converted DC power to the wireless power transmitter 100.

In one example, the power adaptor 400 is a variable power adaptor in which the magnitude of power varies. For example, the power adaptor 400 outputs first DC power and second DC power having a voltage higher than a voltage of the first DC power. Thus, the wireless power transmitter 100 may receive either one of the first DC power and the second DC power from the power adaptor 400.

In one example, the first DC power is used for general charging, and the second DC power is used for quick charging. That is, since the voltage of the second DC power is higher than the voltage of the first DC power, the second DC power may be used for quick charging. For example, the power adaptor 400 may output power of 10 W having a voltage of 5 V and a current of 2 A as the first DC power, or may output power of 15 W having a voltage of 9 V and a current of 1.67 A as the second DC power.

The power adaptor 400 outputs the first DC power or the second DC power in response to a predetermined signal received from the wireless power transmitter 100. For example, when the power adaptor 400 receives a predetermined signal from the wireless power transmitter 100, the power adaptor 400 outputs the second DC power. In this application, a signal provided to the power adaptor 400 by the wireless power transmitter 100 to control the output of the power adaptor 400 is referred to as an "output control signal."

In one example, when the power adaptor 400 receives the output control signal from the wireless power transmitter 100 while outputting the first DC power, the power adaptor 400 outputs the second DC power.

The wireless power transmitter 100 transmits the output control signal to the power adaptor 400, and when the second DC power is supplied from the power adaptor 400, the wireless power transmitter 100 generates power to be wirelessly transmitted using the second DC power. As described above, the second DC power is used for quick charging, and accordingly the wireless power transmitter 100 wirelessly performs the quick charging using the second DC power that is a higher level of power.

Hereinafter, various examples of the wireless power transmitter 100 that performs wireless power charging using the power adaptor 400 supplying DC power having a variable magnitude will be described in more detail.

Figure 2:
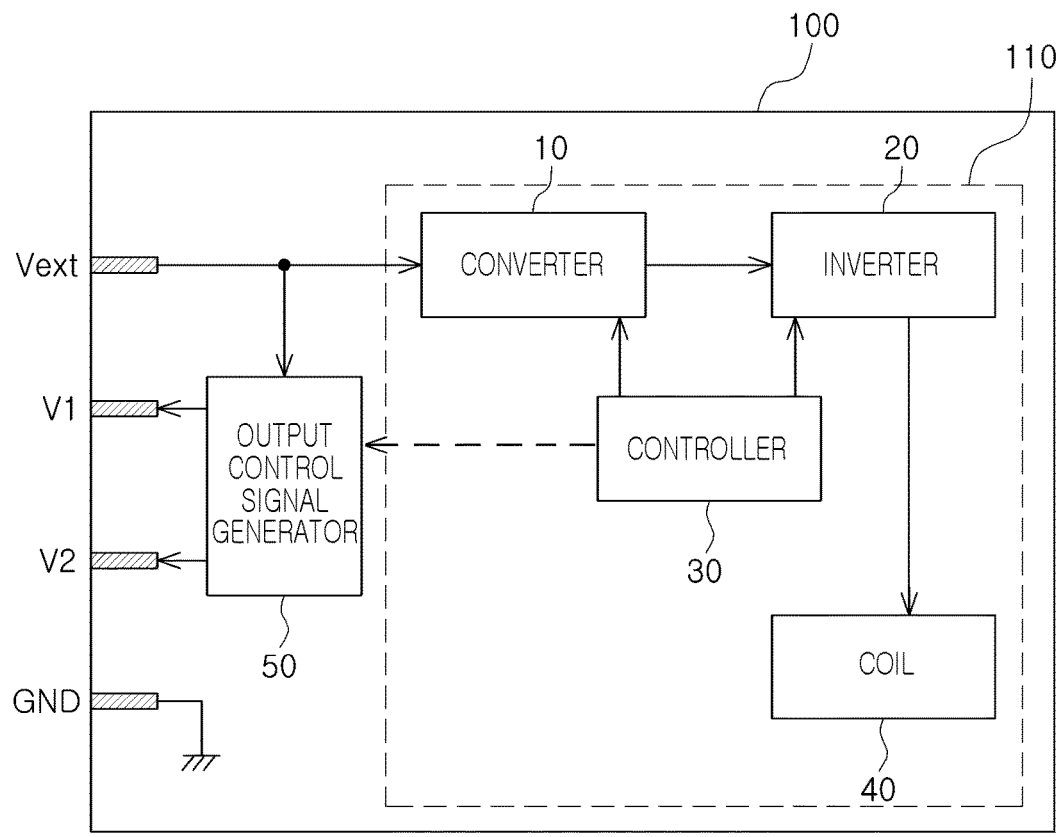
FIG. 2 illustrates a block diagram of an example of a wireless power transmitter.

FIG. 2 illustrates an example of a block diagram of the wireless power transmitter.

Referring to FIG. 2, the wireless power transmitter 100 includes an output control signal generator 50 outputting an output control signal; and a wireless power generator 110 including a converter 10, an inverter 20, a controller 30, and a coil 40.

The wireless power generator 110 generates power to be wirelessly transmitted to a wireless power receiver using external power supplied by the power adaptor 400. The wireless power generator 110 wirelessly transmits the generated power to the wireless power receiver.

The converter 10 converts the external power Vext into driving power for driving the inverter. The external power Vext is DC power, and the driving power is also be DC power.

In one example, a switching mode power supply (SMPS) such as a buck converter, a boost converter, a buck-boost converter, a single-ended primary-inductor (SEPIC) converter, a fly-back converter, or any other SMPS known to one of ordinary skill in the art may be used as the converter 10.

The converter 10 may include a switching element (e.g., a field-effect transistor (FET)) and a magnetic element to output a desired level of voltage through an on-off operation of the switching element.

In some examples, the converter 10 may be omitted from the wireless power generator 110.

The inverter 20 converts the driving power into AC power. The inverter 20 may include at least one switching element (e.g., a field-effect transistor (FET)).

For example, a half-bridge inverter including two FETs or a full-bridge inverter including four FETs may be used as the inverter 20.

The controller 30 controls the converter 10 and the inverter 20 to wirelessly transmit power. For example, the controller 30 may control on/off operations of the switching elements included in the converter 10 and the inverter 20.

In one example, the controller 30 controls the inverter 20 in any one or any combination of any two or more of a frequency modulation mode, a duty ratio modulation mode, a phase-shift mode, and a fixed frequency mode. In a case in which the inverter 20 is controlled in the fixed frequency control mode, the controller 30 controls the magnitude of power that is wirelessly transmitted by the wireless power transmitter 100 by controlling an output voltage of the converter 10.

The AC power is supplied to the coil 40, and the power is wirelessly transmitted through the coil 40.

The output control signal generator 50 generates output control signals V1 and V2 from the external power and supplies the generated output control signals V1 and V2 to the power adaptor 400.

Hereinafter, the output control signals will be described using voltage signals as an example. However, various types of signals such as current signals may be used as the output control signals in other examples. The magnitude of external power Vext supplied from the power adaptor 400 may be adjusted by the output control signals V1 and V2.

The output control signals include a first output control signal V1 and a second output control signal V2.

In one example, the external power includes first DC power, and second DC power having a voltage higher than a voltage of the first DC power. In a case in which the external power is the first DC power, the output control signal generator 50 generates the output control signals V1 and V2 from the first DC power. In one example in which the external power is the second DC power, the output control signal generator 50 does not generate the output control signals V1 and V2. Alternatively, in another example, the output control signal generator 50 generates the output control signals V1 and V2 from the second DC power, but the power adaptor 400 does not respond to the output control signals V1 and V2 generated from the second DC power.

In one example, the output control signals V1 and V2 are voltage signals having a voltage lower than a voltage of the first DC power. Thus, the output control signal generator 50 generates the output control signals V1 and V2 by performing a step-down operation on the first DC power.

In one example, the first output control signal V1 and the second output control signal V2 have different magnitudes. For example, the first output control signal V1 has a voltage of 3.3 V, and the second output control signal V2 has a voltage of 0.6 V.

In one example, the output of the first output control signal V1 and the output of the second output control signal V2 have a time difference therebetween. In addition, the output control signal generator 50 may be controlled by the controller 30 (indicated by the dashed line in FIG. 2). For example, the output control signal generator 50 outputs the first output control signal V1 and the second output control signal V2 having a controlled time difference therebetween determined by the controller 30.

In one example, the output control signal generator 50 determines whether or not to output the first output control signal V1 and the second output control signal V2 according to the control of the controller 30.

Various examples of the output control signal generator 50 will be described below with reference to FIGS. 3 through 22. In addition, although FIG. 2 illustrates a case in which the output control signals V1 and V2 are two voltage signals, the output control signals may be output in various forms in other examples.

FIGS. 3 through 20 are diagrams illustrating examples of the output control signal generator of the wireless power transmitter illustrated in FIG. 2.

Figure 3:
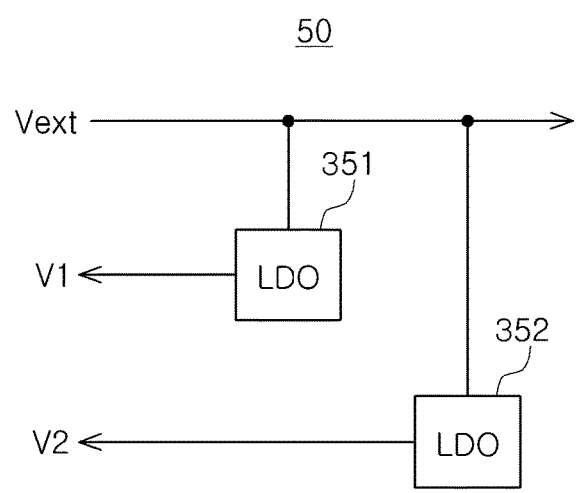
FIGS. 3 through 20 are diagrams illustrating examples of an output control signal generator of the wireless power transmitter illustrated in FIG. 2.

In the example illustrated in FIG. 3, the output control signal generator 50 includes two or more low-dropout (LDO) regulators. Specifically, the output control signal generator 50 includes a first LDO regulator 351 that converts the external power Vext into the first output control signal V1, and a second LDO regulator 352 that converts the external power Vext into the second output control signal V2.

Figure 4:
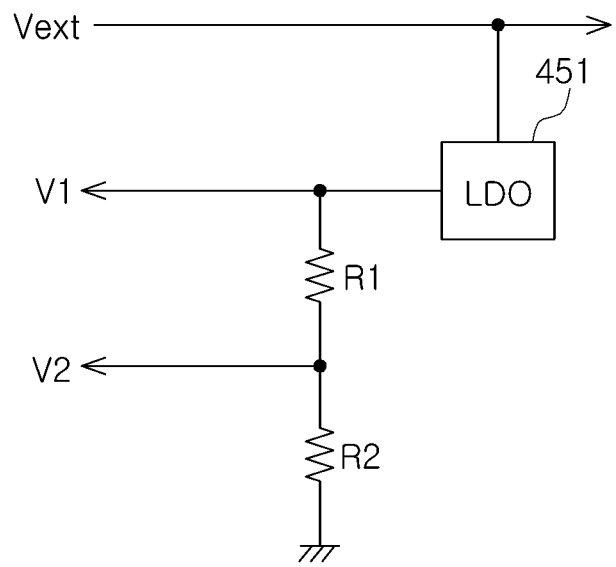

In the example illustrated in FIG. 4, the output control signal generator 50 includes a voltage divider circuit including resistor elements R1 and R2, and an LDO regulator 451. Specifically, the output control signal generator 50 includes the LDO regulator 451 converting the external power Vext into the first output control signal V1, and two or more resistor elements dividing a voltage of the first output control signal to output the second output control signal V2.

Hereinafter, a pair of resistor elements R1 and R2 connected to each other in series may be used as the voltage divider circuit, but this is merely for illustrative purposes. It will be apparent to one of ordinary skill in the art that the voltage divider circuit may have other configurations.

Figure 5:
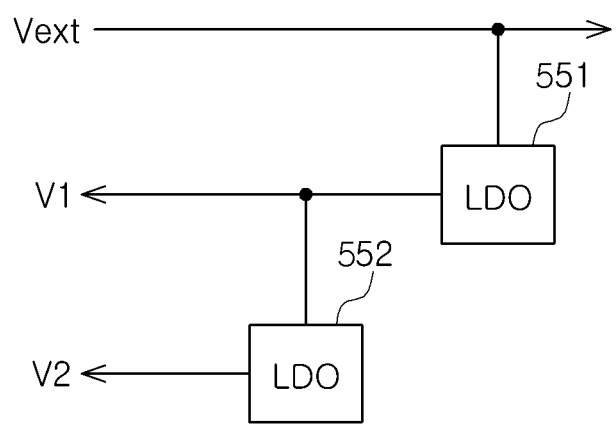

In the example illustrated in FIG. 5, the output control signal generator 50 includes a plurality of LDO regulators. Specifically, the output control signal generator 50 includes a first LDO regulator 551 that converts the external power Vext into the first output control signal V1, and a second LDO regulator 552 that converts the first output control signal V1 into the second output control signal V2.

Figure 6:
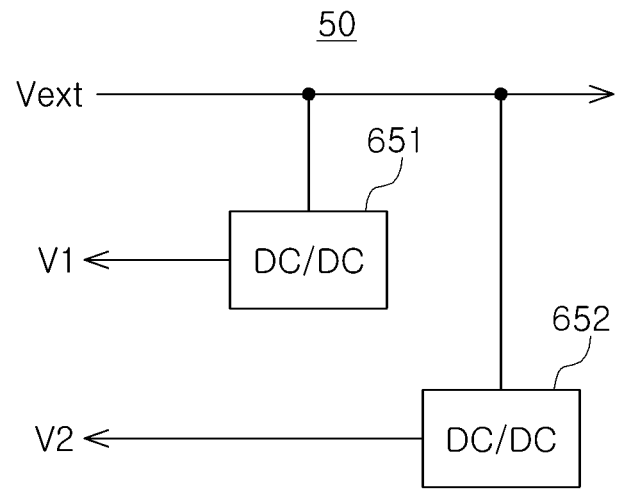

In the example illustrated in FIG. 6, the output control signal generator 50 includes two DC/DC converters. Specifically, the output control signal generator 50 includes a first DC/DC converter 651 that converts the external power Vext into the first output control signal V1, and a second DC/DC converter 652 that converts the external power Vext into the second output control signal V2.

Figure 7:
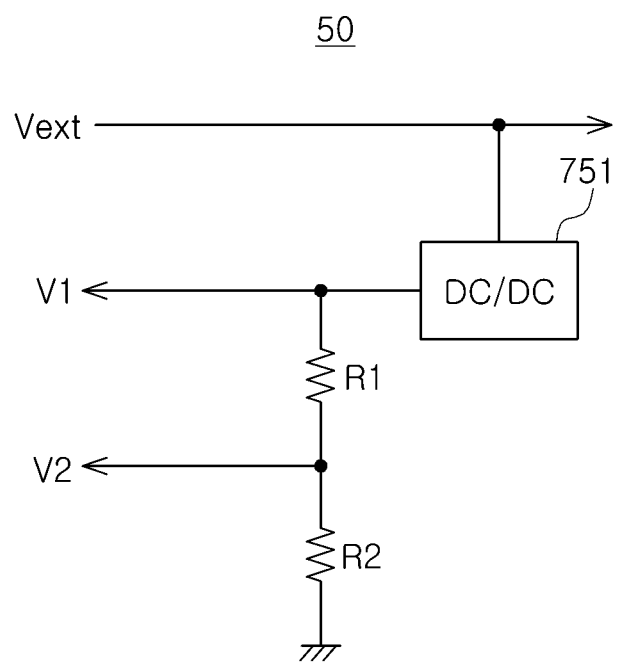

In the example illustrated in FIG. 7, the output control signal generator 50 includes a voltage divider circuit including resistor elements, and a DC/DC converter. Specifically, the output control signal generator 50 includes a DC/DC converter 751 that converts the external power Vext into the first output control signal V1, and two or more resistor elements R1 and R2 dividing a voltage of the first output control signal V1 to generate the second output control signal V2.

Figure 8:
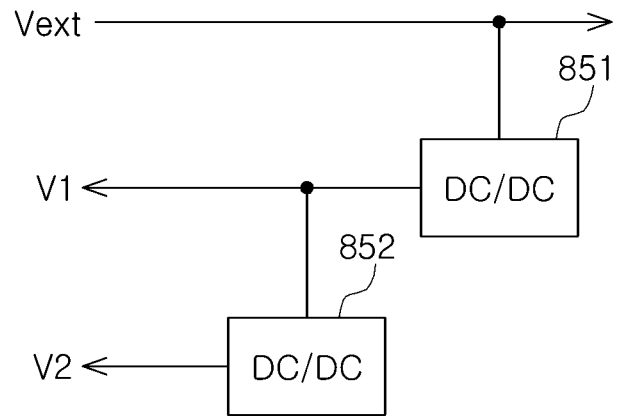

In the example illustrated in FIG. 8, the output control signal generator 50 includes a plurality of DC/DC converters. Specifically, the output control signal generator 50 includes a first DC/DC converter 851 that converts the external power Vext into the first output control signal V1, and a second DC/DC converter 852 that converts the first output control signal V1 into the second output control signal V2.

The DC/DC converters of the output control signal generator 50 illustrated in FIGS. 6 through 8 may be a step-down converter such as a buck converter.

Figure 9:
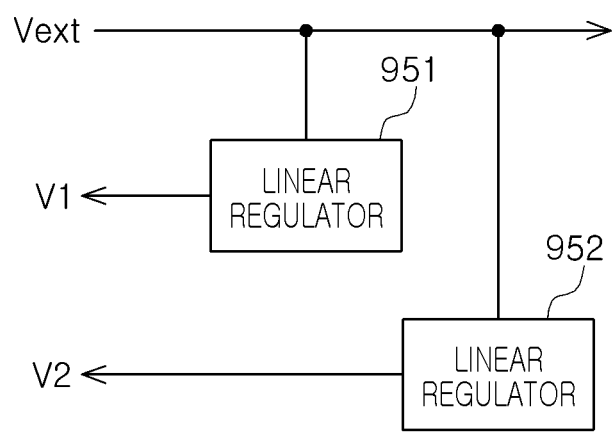

In the example illustrated in FIG. 9, the output control signal generator 50 includes two or more linear regulators. Specifically, the output control signal generator 50 includes a first linear regulator 951 that converts the external power Vext into the first output control signal V1, and a second linear regulator 952 that converts the external power Vext into the second output control signal V2.

Figure 10:
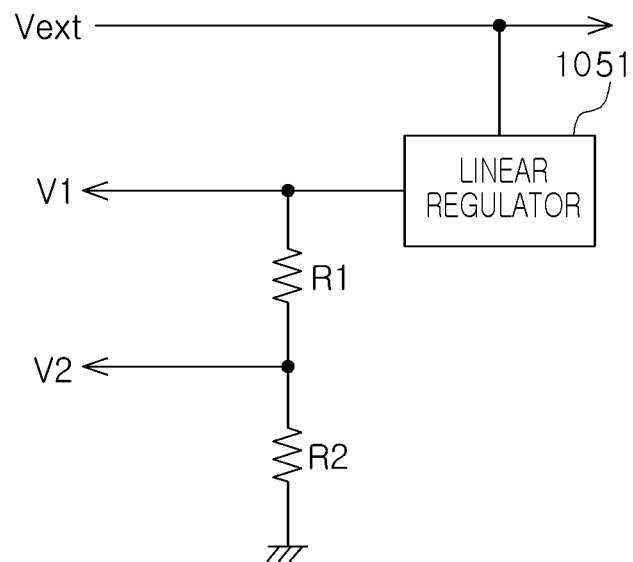

In the example illustrated in FIG. 10, the output control signal generator 50 includes a voltage divider circuit including resistor elements, and a linear regulator. Specifically, the output control signal generator 50 includes a linear regulator 1051 that converts the external power Vext into the first output control signal V1, and two or more resistor elements R1 and R2 dividing a voltage of the first output control signal V1 to generate the second output control signal V2.

Figure 11:
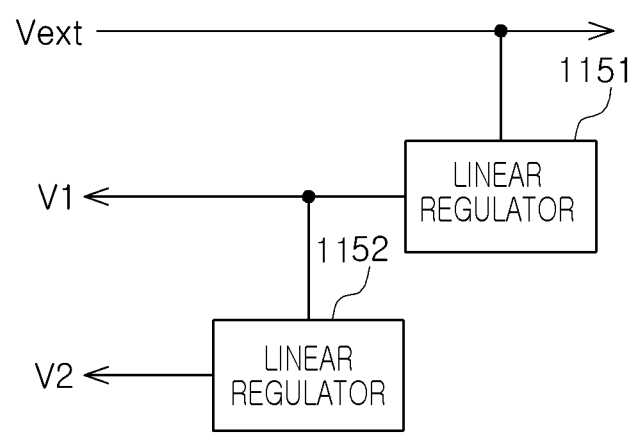

In the example illustrated in FIG. 11, the output control signal generator 50 includes a plurality of linear regulators. Specifically, the output control signal generator 50 includes a first linear regulator 1151 that converts the external power Vext into the first output control signal V1, and a second linear regulator 1152 that converts the first output control signal V1 into the second output control signal V2.

The linear regulator of the output control signal generator 50 illustrated in FIGS. 9 through 11 may include a bipolar junction transistor (BJT).

Figure 12:
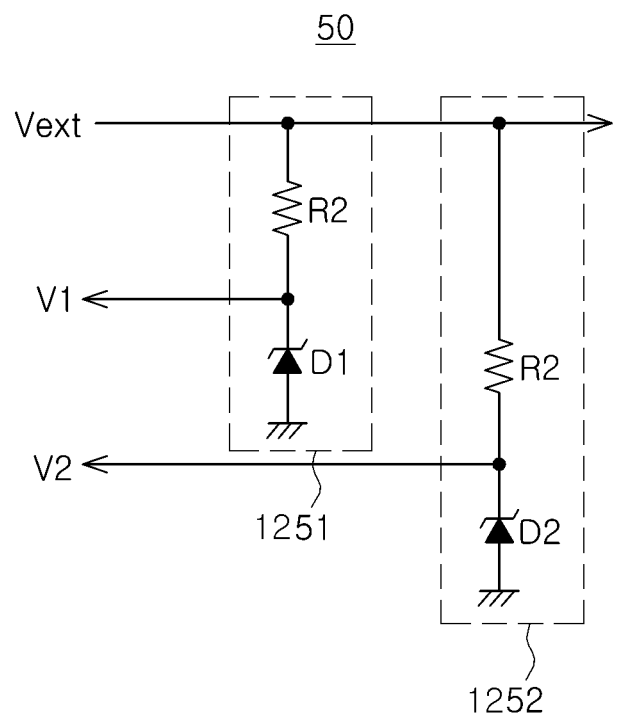

In the example illustrated in FIG. 12, the output control signal generator 50 includes two or more Zener diodes and resistor elements.

Specifically, the output control signal generator 50 includes a first Zener regulator 1251 including a resistor element R1 and a Zener diode D1 connected to each other in series between a terminal to which the external power Vext is input and a ground. The first Zener regulator 1251 outputs the first output control signal V1 at a node to which the resistor element R1 and the Zener diode D1 are connected.

The output control signal generator 50 further includes a second Zener regulator 1252 including a resistor element R2 and a Zener diode D2 connected to each other in series between the terminal to which the external power Vext is input and the ground. The second Zener regulator 1252 outputs the second output control signal V2 at a node to which the resistor element R2 and the Zener diode D2 are connected.

Figure 13:
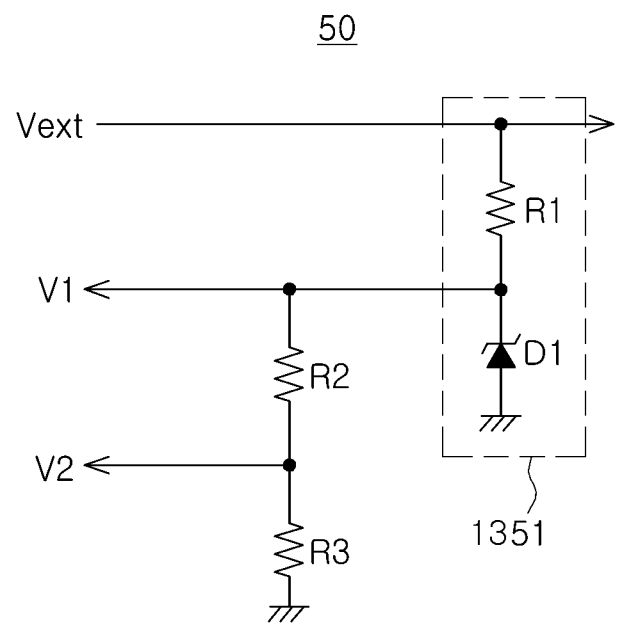

In the example illustrated in FIG. 13, the output control signal generator 50 includes a voltage divider circuit including resistor elements, and a Zener regulator including a Zener diode and a resistor element.

Specifically, the output control signal generator 50 includes a Zener regulator 1351 including a resistor element R1 and a Zener diode D1 connected to each other in series between a terminal to which the external power Vext is input and a ground. The first Zener regulator 1351 outputs the first output control signal V1 at a node to which the resistor element R1 and the Zener diode D1 are connected.

The output control signal generator 50 further includes two resistor elements R2 and R3 dividing a voltage of the first output control signal V1 to generate the second output control signal V2.

Figure 14:
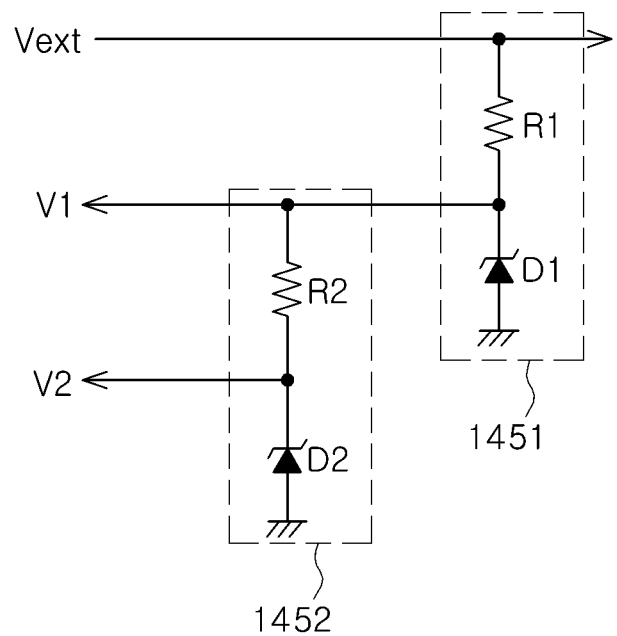

In the example illustrated in FIG. 14, the output control signal generator 50 includes a plurality of Zener regulators.

Specifically, the output control signal generator 50 includes a first Zener regulator 1451 including a resistor element R1 and a Zener diode D1 connected to each other in series between a terminal to which the external power Vext is input and a ground. The first Zener regulator 1451 outputs the first output control signal V1 at a node to which the resistor element R1 and the Zener diode D1 are connected.

In addition, the output control signal generator 50 further includes a second Zener regulator 1452 including a resistor element R2 and a Zener diode D2 connected to each other in series between a terminal to which the first output control signal V1 is output and the ground. The second Zener regulator 1452 outputs the second output control signal V2 at a node to which the resistor element R2 and the Zener diode D2 are connected.

Figure 15:
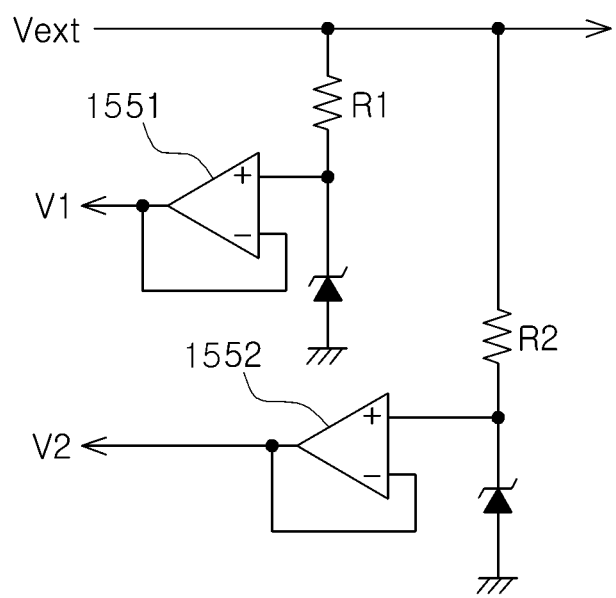
Figure 16:
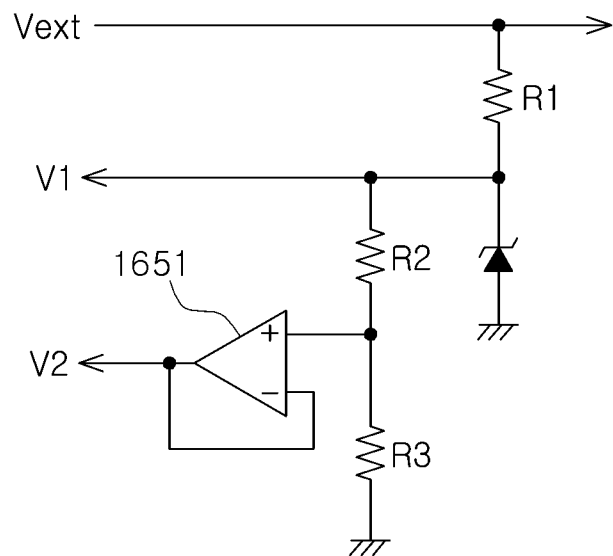
Figure 17:
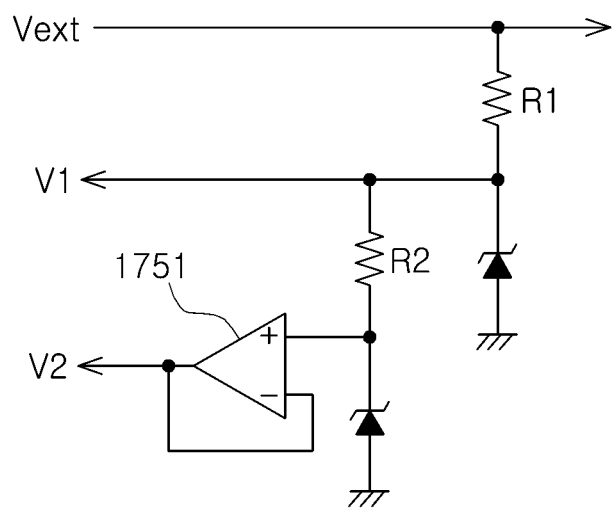

In the examples illustrated in FIGS. 15 through 17, the output control signal generator 50 includes one or more buffers.

In the example illustrated in FIG. 15, both the first output control signal V1 and the second output control signal V2 are output through respective buffers, and in the example illustrated in FIGS. 16 and 17, the second output control signal V2 is output through the buffer.

In the example illustrated in FIG. 15, buffers 1551 and 1552 have been added to the output control signal generator 50 illustrated in FIG. 12.

In the example illustrated in FIG. 16, a buffer 1651 has been added to the output control signal generator 50 illustrated in FIG. 13.

In the example illustrated in FIG. 17, a buffer 1751 has been added to the output control signal generator 50 illustrated in FIG. 14.

However, one or more buffers may also be added to the output control signal generator 50 illustrated in FIGS. 3 through 12 similar to the examples illustrated in FIGS. 15 through 17.

In addition, although FIGS. 16 and 17 illustrate that only the second output control signal V2 is output through a buffer, the first output control signal V1 may also be output through a buffer.

The buffer illustrated in FIGS. 15 through 17 may be a voltage follower using an operational amplifier (op-amp) or other suitable device.

Figure 18:
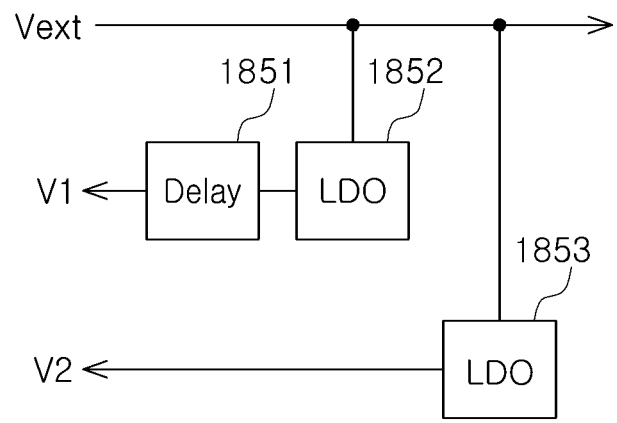
Figure 19:
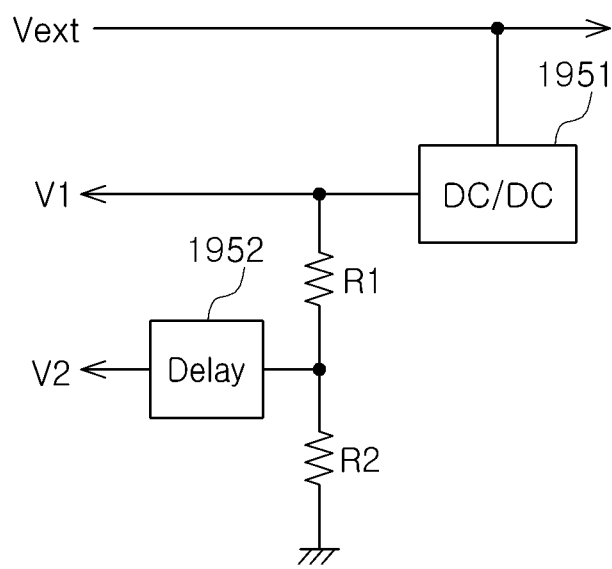
Figure 20:
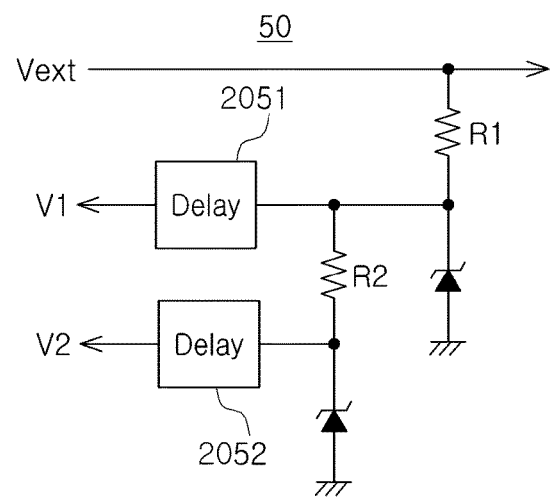

In the examples illustrated in FIGS. 18 through 20, the output control signal generator 50 further includes a delay circuit to generate a predetermined time difference between a timing at which the first output control signal V1 is output and a timing at which the second output control signal V2 is output.

In the example illustrated in FIG. 18, the output control signal generator 50 includes a delay circuit 1851, a first LDO regulator 1852, and a second LDO regulator 1853, and the first output control signal V1 is output through the delay circuit 1851.

In the example illustrated in FIG. 19, the output control signal generator 50 includes a DC/DC converter 1951 and a delay circuit 1952, and the second output control signal V2 is output through the delay circuit 1952.

In the example illustrated in FIG. 20, the first output control signal V1 is output through a delay circuit 2051, and the second output control signal V2 is output through a delay circuit 2052.

In the example illustrated in FIG. 18, the delay circuit 1851 has been added to the output control signal generator 50 including two LDOs illustrated in FIG. 3. However, a delay circuit may also be added to the output control signal generator 50 illustrated in FIGS. 4 through 17 in a similar manner.

In the example illustrated in FIG. 19, the delay circuit 1952 has been added to the output control signal generator 50 including the DC/DC converter and the voltage divider circuit illustrated in FIG. 7. However, a delay circuit may also be added to the output control signal generator 50 illustrated in FIGS. 3 and 5 through 17 in a similar manner.

In the example illustrated in FIG. 20, the delay circuits 2051 and 2052 have been added to the output control signal generator 50 including two Zener regulators illustrated in FIG. 14. However, a delay circuit may also be added to the output control signal generator 50 illustrated in FIGS. 3 through 6 and 8 through 17 in a similar manner.

Figure 21:
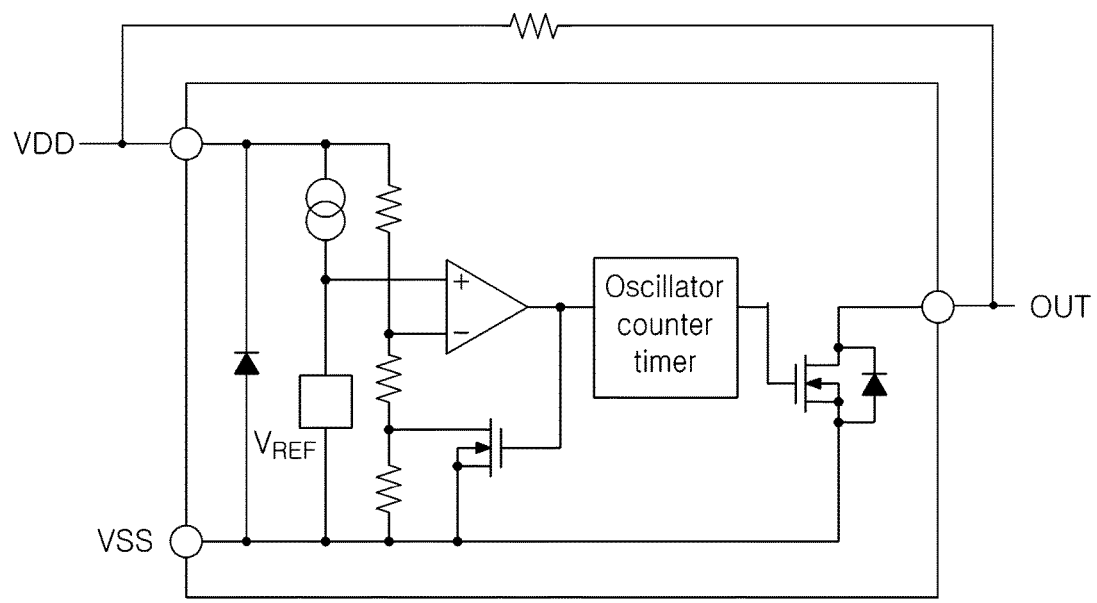
FIGS. 21 and 22 are diagrams illustrating examples of a delay circuit of the output control signal generator of the wireless power transmitter illustrated in FIGS. 18 through 20.
Figure 22:
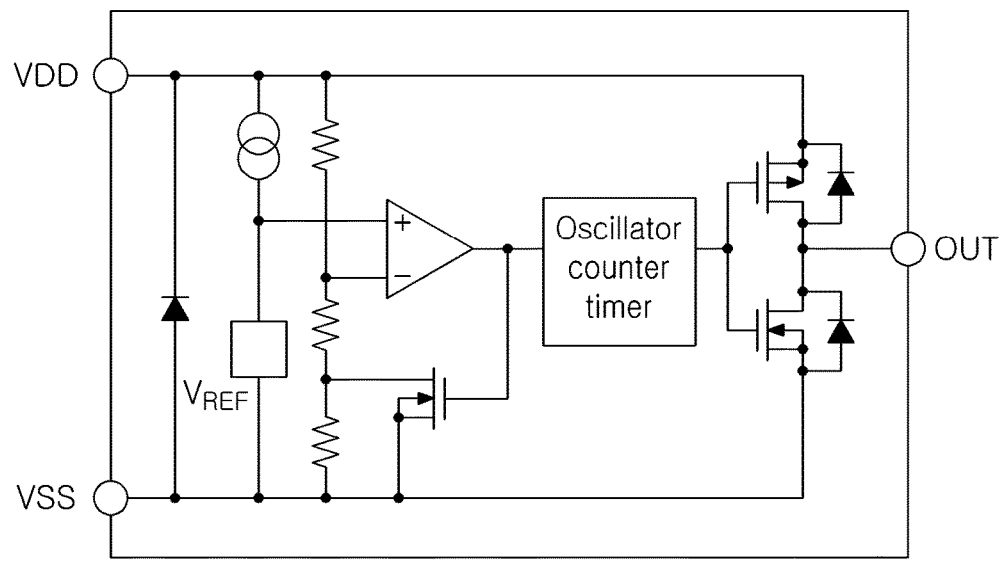

FIGS. 21 and 22 are diagrams illustrating examples of the delay circuit of the output control signal generator 50 illustrated in FIGS. 18 through 20, wherein the delay circuit may include a resistor element, at least one switching element, and an oscillator counter timer.

The delay circuit illustrated in FIGS. 21 and 22 delays the output of a voltage input through an input terminal VDD for a predetermined delay time, and outputs the voltage to an output terminal OUT.

Specifically, when a voltage higher than a reference voltage Vref is input through the input terminal VDD, the oscillator counter timer is activated. The oscillator counter timer counts the number of oscillations generated by an oscillator for a predetermined time, and turns a switching element (e.g., an FET, etc.) on or off to output the voltage input through the input terminal VDD to the output terminal OUT after the predetermined time has elapsed.

The delay circuit illustrated in FIG. 21 is provided with an external resistor. For example, the delay circuit illustrated in FIG. 21 is provided with the external resistor connected between the input terminal VDD and the output terminal OUT outside the delay circuit. When a voltage is input through the input terminal VDD, the delay circuit turns on a switching element (e.g., an FET) connected to the output terminal OUT to output 0 V to the output terminal OUT, and after a predetermined time has elapsed, the delay circuit turns off the switching element to output the voltage input through the input terminal VDD to the output terminal OUT through the external resistor.

The delay circuit illustrated in FIG. 22 is not provided with an external resistor. When a voltage is input through the input terminal VDD, the delay circuit turns on a lower switching element (e.g., an FET) connected to the output terminal OUT to output 0 V to the output terminal OUT, and after a predetermined time has elapsed, the delay circuit turns on an upper switching element (e.g., an FET) to output the voltage input through the input terminal VDD to the output terminal OUT.

Although not illustrated, the output control signal generator 50 may include a protocol integrated circuit (IC). In this case, by using the protocol IC, the output control signal generator 50 may be configured to output a constant digital signal through output terminals through which the first output control signal V1 and the second output control signal V2 are output.

Figure 23:
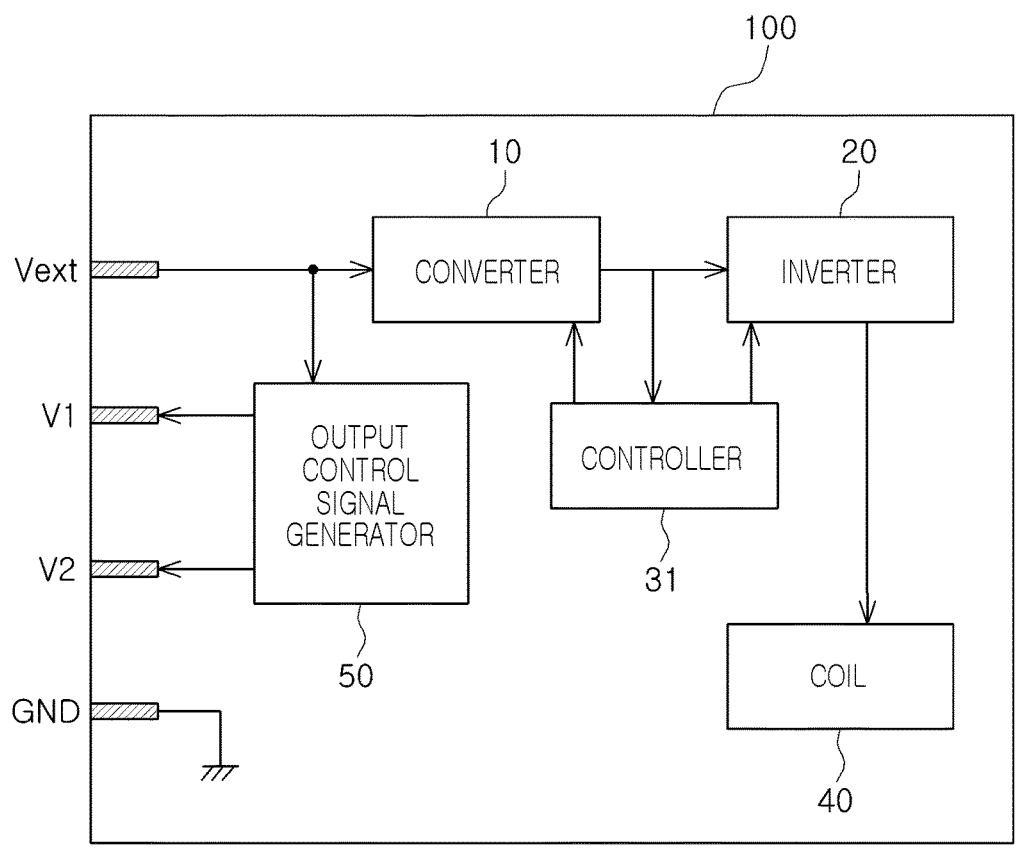
FIG. 23 illustrates a block diagram of another example of a wireless power transmitter.

FIG. 23 illustrates a block diagram of another example of a wireless power transmitter. The wireless power transmitter includes the converter 10, the inverter 20, a controller 31, the coil 40, and the output control signal generator 50.

The functions and operations of the converter 10, the inverter 20, the coil 40, and the output control signal generator 50 are the same as those of the corresponding elements illustrated in FIG. 2, and the output control signal generator 50 may be configured in various forms as illustrated in FIGS. 3 through 20.

The controller 31 variably controls the converter 10 and/or the inverter 20 depending on external power Vext.

For example, the controller 31 variably controls an output of the inverter depending on the magnitude of the external power supplied by the power adaptor 400.

In one example, the controller 31 detects either one or both of an input voltage and an input current input to the inverter 20 to determine the magnitude of the external power Vext.

In a case in which the magnitude of the external power Vext is low, for example, in a case in which the power adaptor 400 supplies the first DC power, the controller 31 increases a duty ratio of a switching element (e.g., an FET) constituting the converter 10.

In a case in which the magnitude of the external power Vext is high, for example, in a case in which the power adaptor 400 supplies the second DC power having the voltage higher than the voltage of the first DC power, the controller 31 controls an output voltage output from the converter 10, that is, an input voltage input to the inverter 20, to be a desired voltage by decreasing the duty ratio of the switching element constituting the converter 10.

Therefore, the controller 31 controls the output power of the inverter 20 depending on the magnitude of the external power Vext.

Figure 24:
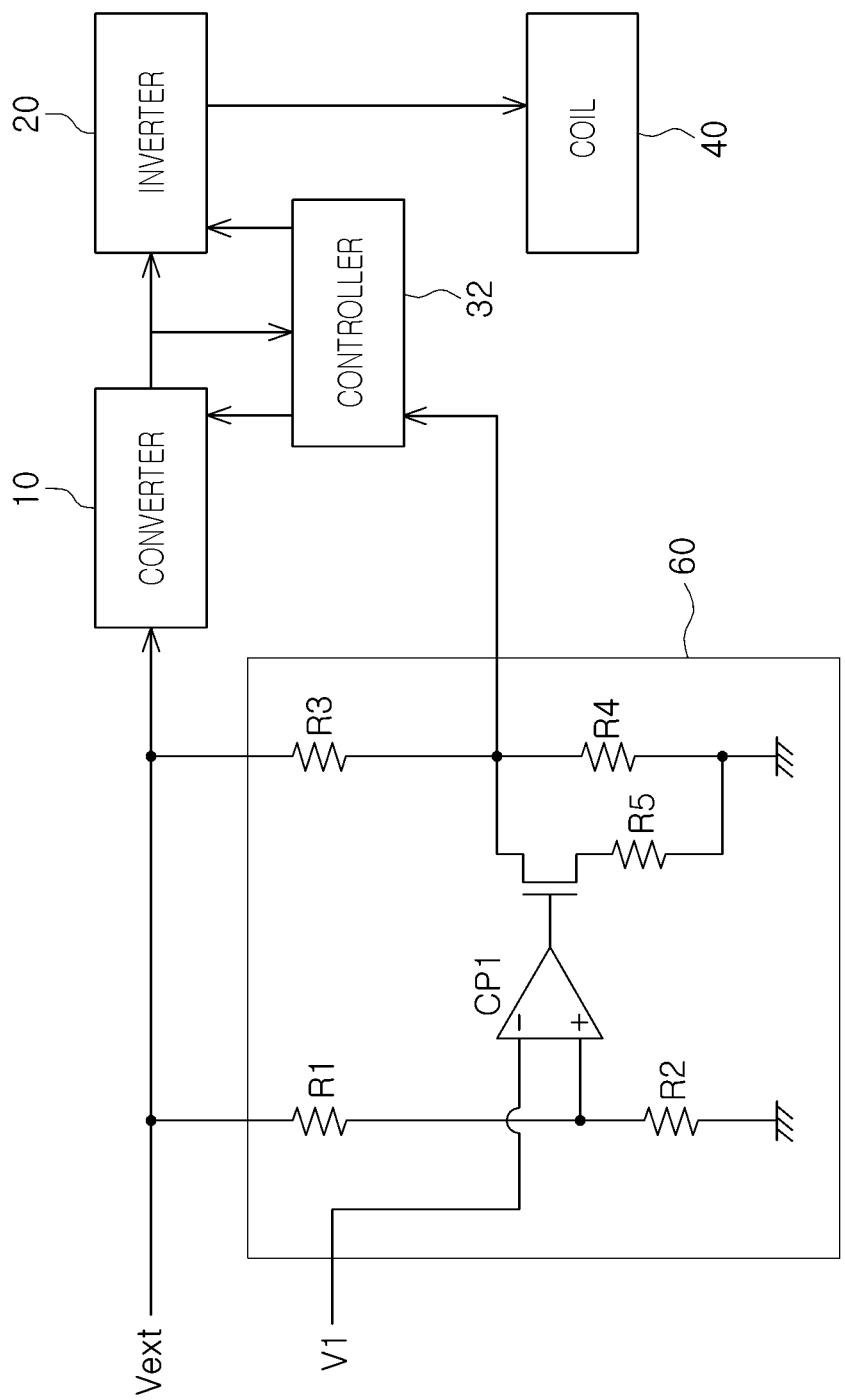
FIG. 24 illustrates a block diagram of another example of a wireless power transmitter.

FIG. 24 illustrates a block diagram of another example of a wireless power transmitter. The wireless power includes the converter 10, the inverter 20, a controller 32, the coil 40, and a voltage input determiner 60, and the voltage input determiner 60 includes a plurality of resistor elements R1 to R5 and a comparator CP1, and supplies a constant DC voltage to the controller 32 to provide the controller 32 with operating power.

As described above, an input voltage Vext input to the wireless power transmitter is variable. In one example, the wireless power transmitter receives a voltage of 5 V or 9 V as the input voltage Vext.

In a case in which the input voltage is varied in a range of 5 V to 9 V, if a resistance divider method as in the related art is used, the DC voltage input to the controller 32 changes depending on the input voltage Vext, so a normal operation of the controller 32 cannot be ensured.

Thus, in the example in FIG. 24, even in the case in which the input voltage Vext having a variable level of 5 V or 9 V is input, the voltage input determiner 60 enables the input of a constant voltage to the controller 32.

Hereinafter, an operation of the voltage input determiner 60 depending on the level of the input voltage Vext will be described.

In a case in which the level of the input voltage Vext is 5 V, the input voltage Vext of 5 V is divided by the resistor R1 and the resistor R2, and the divided voltage is input to a positive terminal of the comparator CP1. In this case, the voltage divided by the resistor R1 and the resistor R2 is lower than a voltage V1. That is, when the level of the input voltage Vext is 5 V, resistance values of the resistor R1 and the resistor R2 are determined so that the voltage divided by the resistor R1 and the resistor R2 is lower than the voltage V1.

The comparator CP1 compares the voltage V1 with the voltage divided by the resistor R1 and the resistor R2 and outputs a LOW value. In this case, the switching element is turned off, and as a result, a first input voltage Vin1 expressed by the following Equation 1 is input to the controller 32.

$$Vin1 = 5 \cdot \frac{R4}{R3+R4} \qquad (1)$$

Meanwhile, in a case in which the level of the input voltage Vext is 9 V, the input voltage Vext of 9 V is divided by the resistor R1 and the resistor R2, and the divided voltage is input to the positive terminal of the comparator CP1. In this case, the voltage divided by the resistor R1 and the resistor R3 is higher than the voltage V1. When the level of the input voltage Vext is 9 V, resistance values of the resistor R1 and the resistor R2 are determined so that the voltage divided by the resistor R1 and the resistor R2 is higher than the voltage V1.

The comparator CP1 compares the voltage V1 with the voltage divided by the resistor R1 and the resistor R2 and outputs a HIGH value. In this case, the switching element is turned on, and as a result, a second input voltage Vin2 expressed by the following Equation 2 is input to the controller 32.

$$Vin2 = 9 \cdot \frac{R4 \| R5}{R3 + R4 \| R5} \qquad (2)$$

In Equation 2, R4∥R5 denotes the equivalent resistance of the resistors R4 and R5 connected in parallel, which may be expressed by the following Equation 3.

$$R4 \| R5 = \frac{R4 \cdot R5}{R4+R5} \qquad (3)$$

Therefore, the resistance values of the resistors R1 to R5 are determined so that the first input voltage Vin1 determined by Equation 1 is equal to the second input voltage Vin2 determined by Equation 2.

Therefore, as described above, even in the case in which the input voltage Vext is variably changed between 5 V and 9 V, a constant voltage is input to the controller 32, and thus the normal operation of the controller 32 is ensured.

The functions and operations of the converter 10, the inverter 20, the coil 40, and the output control signal generator 50 are the same as those of the corresponding elements illustrated in FIG. 2, and the output control signal generator 50 may be configured in various forms as illustrated in FIGS. 3 through 20.

The controller 32 performs the same function as the controller 31 of FIG. 23. In addition, by using an output signal of the voltage input determiner 60, the controller 32 may determine whether or not the external power Vext is input.

The voltage input determiner 60 may generate a sensing signal depending on the magnitude of the first output control signal V1, and may output the generated sensing signal to the controller 32. The sensing signal may be used to determine whether or not the external power Vext is input.

In one example, the magnitude of the external power Vext input to the wireless power transmitter may vary. Thus, even in the case in which the magnitude of the external power Vext varies, the sensing signal may be generated using the first output control signal having a constant voltage, and the controller 32 may determine whether or not the external power Vext is input based on the sensing signal.

As a result, even in the case in which the magnitude of the external power Vext varies, the controller 32 may properly determine whether or not the external power Vext is input.

Although not illustrated, the wireless power transmitter illustrated in FIG. 24 may further include the output control signal generator illustrated in FIGS. 3 through 20.

According to the examples described above, the wireless power transmitter may provide information on the magnitude of the required external power.

The controllers 30, 31, and 32 in FIGS. 2, 23, and 24 that perform the operations described herein with respect to FIGS. 1-24 are implemented by hardware components. Examples of hardware components include controllers, generators, drivers, memories, comparators, arithmetic logic units, adders, subtractors, multipliers, dividers, integrators, analog-to-digital (A/D) converters, digital-to-analog (D/A) converters, amplifiers, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-24. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components as described above are written as computer programs, code segments, instructions or any combination thereof, for individually or collectively instructing or configuring the processor or computer to operate as a machine or special-purpose computer to perform the operations performed by the hardware components as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components as described above.

The instructions or software to control a processor or computer to implement the hardware components as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter for receiving external power from a power adaptor, the wireless power transmitter comprising:
   an output control signal generator configured to generate an output control signal by performing a step-down operation on the external power, and supply the output control signal to the power adaptor; and
   a wireless power generator configured to generate power to be wirelessly transmitted to a wireless power receiver from the external power received from the power adaptor controlled by the output control signal, and wirelessly transmit the generated power to the wireless power receiver.

2. The wireless power transmitter of claim 1, wherein:
   the external power comprises first direct current (DC) power and second DC power having a voltage higher than a voltage of the first DC power; and
   the performing of the step-down operation on the external power comprises performing the step-down operation on the first DC power.

3. A wireless power transmitter for receiving external power from a power adaptor, the wireless power transmitter comprising:
   an output control signal generator configured to generate an output control signal using the external power, and supply the output control signal to the power adaptor; and
   a wireless power generator configured to generate power to be wirelessly transmitted to a wireless power receiver from the external power received from the power adaptor controlled by the output control signal, and wirelessly transmit the generated power to the wireless power receiver,
   wherein the output control signal comprises:
   a first output control signal; and
   a second output control signal having a voltage lower than a voltage of the first output control signal.

4. The wireless power transmitter of claim 3, wherein the output control signal generator comprises:
   a first low-dropout (LDO) regulator configured to convert the external power into the first output control signal; and
   a second LDO regulator configured to convert the external power into the second output control signal.

5. The wireless power transmitter of claim 3, wherein the output control signal generator comprises:
an LDO regulator configured to convert the external power into the first output control signal; and
two or more resistor elements configured to divide the first output control signal and output the divided first output control signal as the second output control signal.

6. The wireless power transmitter of claim 3, wherein the output control signal generator comprises:
a first LDO regulator configured to convert the external power into the first output control signal; and
a second LDO regulator configured to convert the first output control signal into the second output control signal.

7. The wireless power transmitter of claim 3, wherein the output control signal generator comprises:
a first DC/DC converter configured to convert the external power into the first output control signal; and
a second DC/DC converter configured to convert the external power into the second output control signal.

8. The wireless power transmitter of claim 3, wherein the output control signal generator comprises:
a DC/DC converter configured to convert the external power into the first output control signal; and
two or more resistor elements configured to divide the first output control signal and output the divided first output control signal as the second output control signal.

9. The wireless power transmitter of claim 3, wherein the output control signal generator comprises:
a first linear regulator configured to convert the external power into the first output control signal; and
a second linear regulator configured to convert the external power into the second output control signal.

10. The wireless power transmitter of claim 3, wherein the output control signal generator comprises:
a first linear regulator configured to convert the external power into the first output control signal; and
a second linear regulator configured to convert the first output control signal into the second output control signal.

11. The wireless power transmitter of claim 3, wherein the output control signal generator comprises:
a first linear regulator configured to convert the external power into the first output control signal; and
two or more resistor elements configured to divide the first output control signal and output the divided first output control signal as the second output control signal.

12. The wireless power transmitter of claim 3, wherein the output control signal generator comprises:
a first Zener regulator connected in series between a terminal to which the external power is input and a ground terminal, and configured to output the first output control signal from the external power; and
a second Zener regulator connected in series between the terminal to which the external power is input and the ground terminal, and configured to output the second output control signal from the external power; and
each of the first and second Zener regulators comprises a resistor element and a Zener diode connected to each other in series.

13. The wireless power transmitter of claim 3, further wherein the output control signal generator is configured to generate the output control signal by performing a step-down operation on the external power.

14. The wireless power transmitter of claim 13, wherein:
the external power comprises first direct current (DC) power and second DC power having a voltage higher than a voltage of the first DC power; and
the performing of the step-down operation on the external power comprises performing the step-down operation on the first DC power.

15. A wireless power transmitter for receiving, from a power adaptor, first direct current (DC) power or second DC power having a voltage higher than a voltage of the first DC power, the wireless power transmitter comprising:
an output control signal generator configured to generate an output control signal by performing a step-down operation on the first DC power, and supply the output control signal to the power adaptor; and
a wireless power generator configured to generate power to be wirelessly transmitted to a wireless power receiver from the first DC power or the second DC power received from the power adaptor controlled by the output control signal, and wirelessly transmit the generated power to the wireless power receiver.

16. The wireless power transmitter of claim 15, wherein the wireless power generator comprises:
a converter configured to convert the first DC power or the second DC power into driving power;
an inverter configured to convert the driving power into alternating current (AC) power to be wirelessly transmitted to the wireless power receiver; and
a controller configured to control the converter and the inverter.

17. The wireless power transmitter of claim 16, wherein the controller is further configured to variably control an output of the inverter depending on a magnitude of the DC power received from the power adaptor.

18. The wireless power transmitter of claim 16, wherein the converter comprises a switching element; and
the controller is further configured to increase a duty ratio of the switching element of the converter in response to the first DC power being received from the power adaptor, and decrease a duty ratio of the switching element of the converter in response to the second DC power being received from the power adaptor.

19. A wireless power transmitter comprising:
an output control signal generator configured to receive external power from a power adaptor, generate an output control signal to control the power adaptor to change the external power, and supply the output control signal to the power adaptor, the power adaptor being configured to change the external power in response to the output control signal; and
a wireless power generator configured to generate power to be wirelessly transmitted to a wireless power receiver from the external power received from the power adaptor controlled by the output control signal, and wirelessly transmit the generated power to the wireless power receiver,
wherein the power adaptor is further configured to output first external power in response to the output control signal being in a first state, and output second external power having a different magnitude than the first external power in response to the output control signal being in a second state.

20. The wireless power transmitter of claim 19, wherein the power adaptor is further configured to output the first external power in the absence of the output control signal, and output the second external power having a different magnitude than the first external power in response to the presence of the output control signal.

21. A wireless power transmitter comprising:

an output control signal generator configured to receive external power from a power adaptor, generate an output control signal to control the power adaptor to change the external power, and supply the output control signal to the power adaptor, the power adaptor being configured to change the external power in response to the output control signal; and a wireless power generator configured to generate power to be wirelessly transmitted to a wireless power receiver from the external power received from the power adaptor controlled by the output control signal, and wirelessly transmit the generated power to the wireless power receiver, wherein the external power is direct current (DC) power;

wherein the wireless power generator is further configured to convert the DC power into alternating current (AC) power to be wirelessly transmitted to the wireless power receiver; and wherein the wireless power generator comprises a controller configured to control a magnitude of the AC power.

22. The wireless power transmitter of claim 21, further comprising a voltage input determiner configured to receive the external power, generate a constant DC voltage from the external power, and supply the constant DC voltage to the controller to provide the controller with operating power.

23. The wireless power transmitter of claim 21, wherein the power adaptor is further configured to output first external power in response to the output control signal being in a first state, and output second external power having a different magnitude than the first external power in response to the output control signal being in a second state.

* * * * *